(12) United States Patent
Shirono

(10) Patent No.: US 9,413,968 B2
(45) Date of Patent: Aug. 9, 2016

(54) CAMERA APPARATUS AND WIRELESS COMMUNICATION TERMINAL INCLUDING THE SAME

(71) Applicant: SAMSUNG ELECTRONICS CO., LTD., Suwon-si, Gyeonggi-do (KR)

(72) Inventor: Masahiro Shirono, Yokohama (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 226 days.

(21) Appl. No.: 14/242,995

(22) Filed: Apr. 2, 2014

(65) Prior Publication Data

US 2014/0300791 A1  Oct. 9, 2014

(30) Foreign Application Priority Data

Apr. 4, 2013 (JP) .................................. 2013-078715
Jan. 8, 2014 (KR) ......................... 10-2014-0002493

(51) Int. Cl.
*H04N 5/225* (2006.01)
*H04N 5/232* (2006.01)
*G03B 13/06* (2006.01)

(52) U.S. Cl.
CPC ............ *H04N 5/23293* (2013.01); *G03B 13/06* (2013.01); *G03B 2215/0507* (2013.01)

(58) Field of Classification Search
None
See application file for complete search history.

(56) References Cited

U.S. PATENT DOCUMENTS

| | | | | |
|---|---|---|---|---|
| 4,545,661 A * | 10/1985 | Hamaguchi | ............ | G03B 17/52 396/176 |
| 5,146,253 A * | 9/1992 | Swayze | .................. | G03B 17/04 396/349 |
| 5,701,535 A * | 12/1997 | Reibl | ..................... | G03B 17/04 396/348 |
| 6,302,597 B1 * | 10/2001 | Chang | ................... | G03B 13/02 396/373 |
| 6,453,126 B1 * | 9/2002 | Abe | ........................ | G03B 17/48 348/64 |
| 7,298,410 B2 * | 11/2007 | Kim | .................... | H04N 5/23293 348/333.06 |
| 2001/0005454 A1 * | 6/2001 | Nishino | .............. | H04M 1/0216 396/287 |
| 2002/0067426 A1 * | 6/2002 | Nagata | ................. | H04N 5/2251 348/373 |
| 2003/0020823 A1 * | 1/2003 | Ko | ....................... | H04N 5/2251 348/341 |
| 2005/0190278 A1 * | 9/2005 | Oh | ..................... | H04N 5/23293 348/333.01 |
| 2010/0104272 A1 * | 4/2010 | Ogino | .................... | G03B 13/02 396/374 |
| 2011/0243454 A1 * | 10/2011 | Miyajima | ........... | G01C 21/165 382/195 |
| 2012/0195584 A1 * | 8/2012 | Seita | ..................... | G03B 13/06 396/374 |

FOREIGN PATENT DOCUMENTS

| | | |
|---|---|---|
| JP | 09-168107 A | 6/1997 |
| JP | 2001-028700 A | 1/2001 |
| JP | 2004-274202 A | 9/2004 |
| JP | 3752822 B2 | 3/2006 |

* cited by examiner

*Primary Examiner* — Twyler Haskins
*Assistant Examiner* — Wesley J Chiu
(74) *Attorney, Agent, or Firm* — Drinker Biddle & Reath LLP

(57) ABSTRACT

A camera apparatus and a wireless communication terminal including the camera apparatus are described. The camera apparatus includes: a camera main body; and a viewfinder unit including an elastic member. The elastic member is retracted when the viewfinder unit is retracted into the camera main body and is extended when the viewfinder unit is extended outward in an extending direction from the camera main body. The viewfinder unit includes: an object lens; an ocular movable in a direction different from the extending direction of the viewfinder unit; and a mirror that reflects a first optical signal that passes through the object lens toward the ocular.

11 Claims, 12 Drawing Sheets

CAMERA APPARATUS AND WIRELESS COMMUNICATION TERMINAL INCLUDING THE SAME

RELATED APPLICATIONS

This application claims the priority benefit of Japanese Patent Application No. 2013-0078715, filed on Apr. 4, 2013, in the Japanese Patent Office and Korean Patent Application No. 10-2014-0002493, filed on Jan. 8, 2014, in the Korean Intellectual Property Office, the disclosures of which are incorporated herein in their entireties by reference.

BACKGROUND

1. Field

One or more embodiments of the present disclosure relate to a camera apparatus and a wireless communication terminal including the camera apparatus.

2. Related Art

In the related art, cameras having viewfinders have been developed. Such cameras having viewfinders may be used in wireless communication terminals such as smartphones.

Japanese Patent Application Publication No. 2001-28700 discloses a related technique. The disclosed technique relates to a movable viewfinder including a slidable housing and a rotary housing. The slidable housing is movable along the optical axis of an ocular, and the rotary housing makes slidable contact with the slidable housing and is attached to a main body of a camera. A camera using the movable viewfinder may be easily carried and operated.

However, the size of the disclosed viewfinder is not sufficiently reduced although the viewfinder is retracted by sliding the slidable housing. For example, if a camera, including such a movable viewfinder, is used in a wireless communication terminal, the size of the wireless communication terminal may be increased.

As described above, in the related art, cameras and wireless communication terminals including cameras are still large.

SUMMARY

According to one or more embodiments of the present disclosure, a camera apparatus includes: a camera main body; and a viewfinder unit including an elastic member. The elastic member is retracted when the viewfinder unit is retracted into the camera main body and is extended when the viewfinder unit is extended outward in an extending direction from the camera main body. The viewfinder unit includes: an object lens; an ocular movable in a direction different from the extending direction of the viewfinder unit; and a mirror that reflects a first optical signal that passes through the object lens toward the ocular.

The ocular may be movable in a direction perpendicular to the extending direction of the viewfinder unit.

When the viewfinder unit is extended, the ocular may be moved outward from the viewfinder unit, and when the viewfinder unit is retracted, the ocular may be moved into the viewfinder unit.

The viewfinder unit may include a guide such that a portion of a force that retracts the viewfinder unit is transmitted by the guide to move the ocular into the viewfinder unit.

The mirror may be rotated based on movement of the ocular.

When the viewfinder unit is extended, the mirror may be rotated to a position at which an optical axis of the object lens reflected by the mirror is aligned with an optical axis of the ocular, and when the viewfinder unit is retracted, the mirror may be rotated to a position at which a space is formed beside a reflection surface of the mirror to accommodate the ocular.

The viewfinder unit may include an optical path adjustment unit such that an extending degree of the viewfinder unit is adjustable using the optical path adjustment unit.

The viewfinder unit may include a flash disposed in a region opposite to a reflection surface of the mirror.

The camera main body may include: a photographing lens that receives a second optical signal reflected from an object; an image sensor that converts the second optical signal incident on the photographing lens into an electric signal; and a display unit that displays a conversion result of the image sensor as an image. The object lens may receive the image displayed on the display unit as the first optical signal.

A wireless communication terminal may include the camera apparatus.

The viewfinder unit may include a viewfinder window. The viewfinder window and the ocular may be completely accommodated in the camera main body when the viewfinder is retracted.

According to one or more embodiments of the present disclosure, a camera apparatus includes: a camera main body; and a viewfinder unit including an elastic member, the elastic member being retracted when the viewfinder unit is retracted into the camera main body, and being extended when the viewfinder unit is extended outward in an extending direction from the camera main body. The viewfinder unit includes: an object lens; an ocular; a reflection member that reflects a first optical signal that passes through the object lens toward the ocular; and a flash disposed in a region separate from a reflection region of the reflection member.

The reflection member may be a mirror.

The reflection member may be a prism.

A wireless communication terminal may include the camera apparatus.

When the viewfinder unit is extended, the ocular may be moved outward from the viewfinder unit in a direction different from the extending direction of the viewfinder unit, and when the viewfinder unit is retracted, the ocular may be moved into the viewfinder unit.

The camera main body may include: a photographing lens that receives a second optical signal reflected from an object; an image sensor that converts the second optical signal incident on the photographing lens into an electric signal; and a display unit that displays a conversion result of the image sensor as an image. The object lens may receive the image displayed on the display unit as the first optical signal.

The viewfinder unit may include an optical path adjustment unit such that an extending degree of the viewfinder unit is adjustable using the optical path adjustment unit.

The viewfinder unit may include a viewfinder window. An optical path formed along the display unit, the object lens, the reflection member, the ocular, and the viewfinder window may be adjustable using the optical path adjustment unit.

The viewfinder window and the ocular may be completely accommodated in the camera main body when the viewfinder is retracted.

BRIEF DESCRIPTION OF THE DRAWINGS

These and/or other embodiments will become apparent and more readily appreciated from the following description of various embodiments, taken in conjunction with the accompanying drawings in which.

DETAILED DESCRIPTION

Figure 1A:
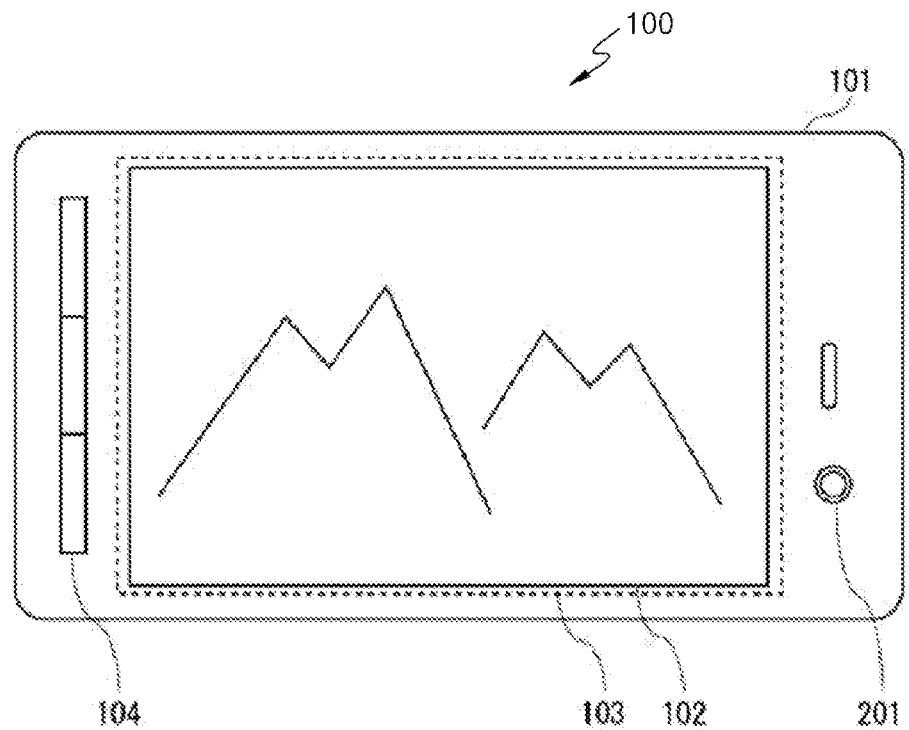
FIG. 1A is a front view of a wireless communication terminal according to an embodiment.

Reference will now be made in detail to various embodiments, examples of which are illustrated in the accompanying drawings, wherein like reference numerals refer to like elements throughout. In this regard, the embodiments may have different forms and should not be construed as being limited to the descriptions set forth herein. Accordingly, the embodiments are merely described below, by referring to the figures, to explain features of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, various embodiments will be described with reference to the accompanying drawings.

Figure 1B:
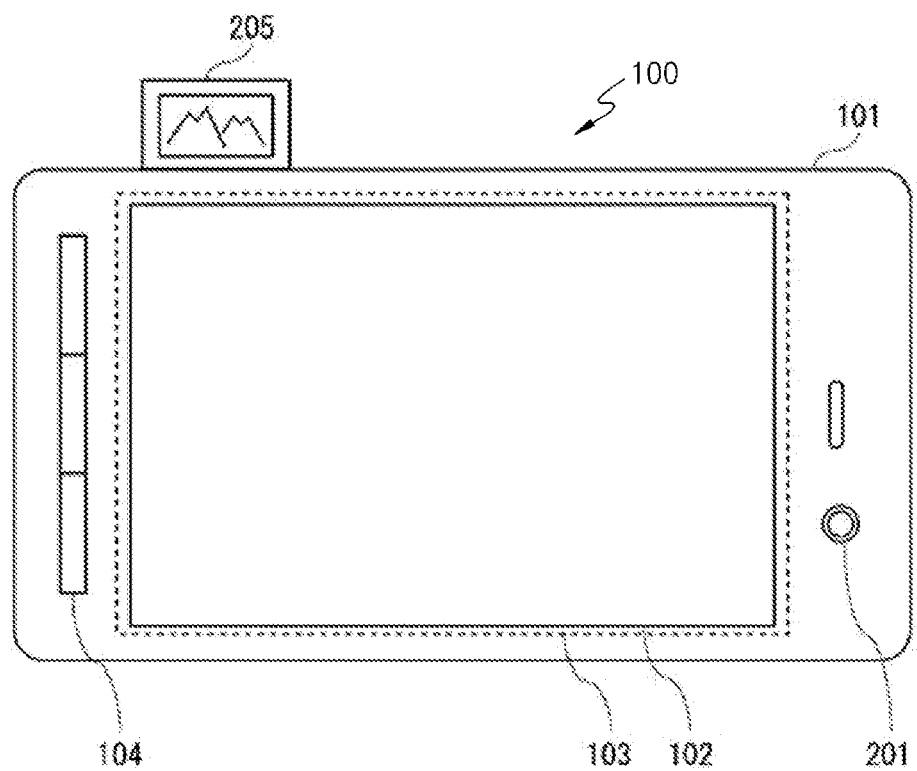
FIG. 1B is another front view of the wireless communication terminal of FIG. 1A according to the embodiment.
Figure 1C:
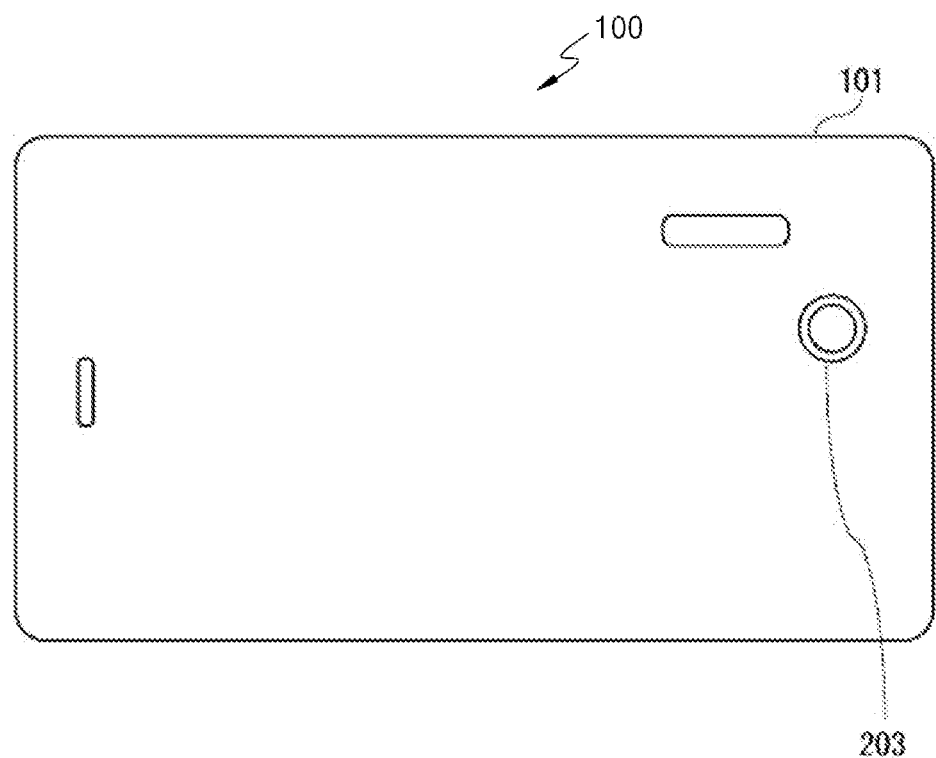
FIG. 1C is a rear view of the wireless communication terminal of FIG. 1A according to the embodiment.

A wireless communication terminal including a camera apparatus, according to an embodiment, will now be described with respect to FIGS. 1A, 1B, and 1C. In detail, FIGS. 1A, 1B, and 1C are a first front view, a second front view, and a rear view of a wireless communication terminal 100. Referring to FIG. 1A, FIGS. 1B, and 1C, the wireless communication terminal 100 may be a smartphone. However, the wireless communication terminal 100 of the current embodiment may be another type of wireless communication terminal such as a feature phone, a portable gaming terminal, or a tablet personal computer (PC).

FIGS. 1A and 1B are front views of the wireless communication terminal 100, taken from a main side (front side) of a housing 101 of the wireless communication terminal 100. FIG. 1A is a front view of the wireless communication terminal 100 when a viewfinder unit 205 is retracted (not used), and FIG. 1B is a front view of the wireless communication terminal 100 when the viewfinder unit 205 is extended. A liquid crystal panel 102 (e.g., liquid crystal display or LCD), a touch panel 103, a plurality of buttons 104, and a photographing lens 201 of a camera apparatus 200 (FIG. 2) are arranged on the front side of the housing 101. The viewfinder unit 205 including an elastic member 221 is disposed in the housing 101. The viewfinder unit 205 is retractable into the housing 101 (i.e., into a camera main body) and extendable from the housing 101 (i.e., from the camera main body). The elastic member 221 is retracted when the viewfinder 205 is retracted into the camera main body, and is extended when the viewfinder 205 is extended outward from the camera main body.

FIG. 1C is a rear view of the wireless communication terminal 100, taken from the other main side (rear side) of the housing 101 of the wireless communication terminal 100. For example, a photographing lens 203 of the camera apparatus 200 may be disposed on the rear side of the housing 101.

The liquid crystal panel 102 includes a screen disposed on the front side of the housing 101. Instead of the liquid crystal panel 102, another display device (display unit) such as an organic light-emitting diode (OLED) panel may be used.

The touch panel 103 may be disposed on the front side of the liquid crystal panel 102 to cover the screen of the liquid crystal panel 102 or may be disposed on the rear side of the liquid crystal panel 102. For example, a user may intuitively operate the wireless communication terminal 100 by touching a touch region of the liquid crystal panel 102 with a finger or a manipulation pen (e.g., a stylus).

The buttons 104 are also used to manipulate the wireless communication terminal 100. In some embodiments, the buttons 104 may be omitted based on the type of the wireless communication terminal 100. The photographing lens 203 is a main photographing lens disposed on the rear side of the housing 101. The photographing lens 201 may be a secondary photographing lens disposed on the front side of the housing 101 (e.g., a front-facing lens). In some embodiments, the photographing lens 201 may be omitted.

Figure 2:
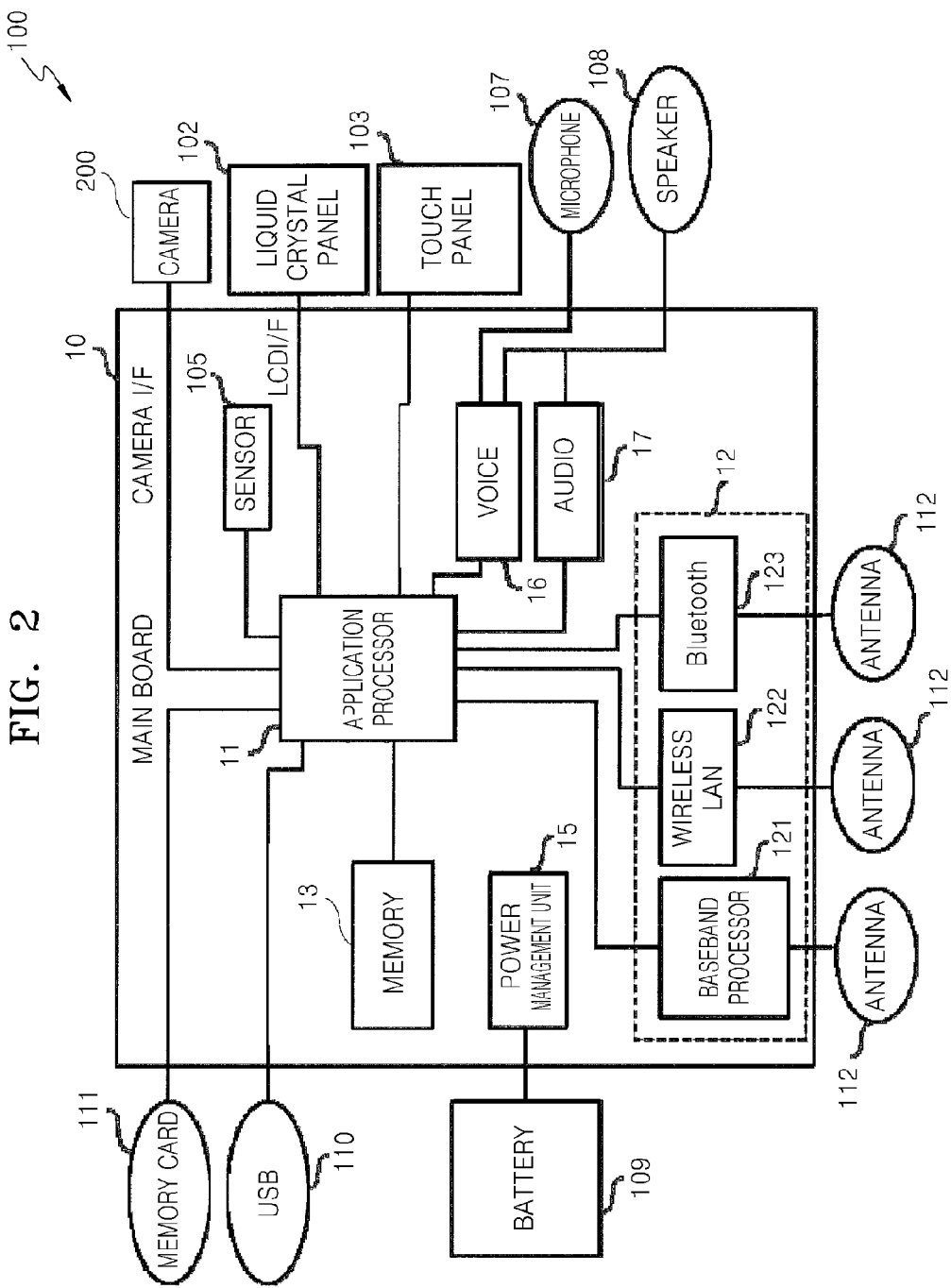
FIG. 2 is a block diagram illustrating an internal configuration of the wireless communication terminal of FIG. 1A according to an embodiment.

FIG. 2 is a block diagram illustrating an internal configuration of the wireless communication terminal 100 according to an embodiment. Referring to FIG. 2, an application processor 11, a wireless processing unit 12, a memory 13, a power management unit 15, a voice circuit 16, an audio circuit 17, and a sensor 105 may be disposed on a main board 10 of the wireless communication terminal 100. The liquid crystal panel 102, the touch panel 103, and the camera apparatus 200 may be connected to the main board 10. In addition, a microphone 107, a speaker 108, a battery 109, a USB 110, a memory card 111, and one or more antennas 112 may be connected to the main board 10.

The application processor 11 in one example is a system on a chip (SoC) device in which various peripheral circuits are packaged. The application processor 11 includes various interface circuits for connecting peripheral devices such as a communication device (for example, the wireless processing unit 12), the touch panel 103, and the camera apparatus 200.

The application processor 11 reads programs stored in the memory 13 and performs processing to execute various functions of the wireless communication terminal 100. For example, the application processor 11 reads an operating system (OS) program from the memory 13 to execute the OS program, and along with this, the application processor 11 executes application programs running based on the OS program.

The wireless processing unit 12 includes a baseband processor 121, a wireless local area network (LAN) device 122, and a Bluetooth™ device 123. The baseband processor 121 performs baseband processing such as encoding (e.g., error-correction encoding using a convolution code or a turbo code) of data to be transmitted via the wireless communication terminal 100 or decoding of data received via the wireless communication terminal 100. In detail, the baseband processor 121 may encode transmission data received from the application processor 11 and modulate the transmission data using carrier waves to generate a transmission signal. The transmission signal may be transmitted through the antenna 112. In addition, the baseband processor 121 may demodulate a signal received through the antenna 112 by extracting data from carrier waves and may decode the data to transmit the decoded data to the application processor 11.

Programs and data for the application processor 11 are stored in the memory 13. The memory 13 includes one or more of a nonvolatile memory (such as a flash memory) capable of retaining stored data even when not powered, or a volatile memory not retaining data when not powered.

The battery 109 is used when the wireless communication terminal 100 is operated without being powered by an external power source. In addition, the wireless communication terminal 100 may be powered by the battery 109 even when being connected to an external power source. The battery 109 may be a secondary battery.

The power management unit 15 may generate internal power from the battery 109 or an external power source. Such internal power is supplied to each block of the wireless communication terminal 100. The power management unit 15 may control internal power to each block under the control of the application processor 11. In addition, when an external power source is connected, the power management unit 15 may control charging of the battery 109.

The audio circuit 17 decodes voice data received from the application processor 11 to operate the speaker 108. The voice circuit 16 encodes voice information obtained from the microphone 107 to generate voice data, and the voice data is transmitted to the application processor 11.

Examples of the sensor 105 include a temperature sensor and a global positioning system (GPS) sensor. When the battery 109 is charged, the temperature of the battery 109 may be controlled using the temperature sensor. With the GPS, a position of the wireless communication terminal 100 may be precisely determined, and thus the wireless communication terminal 100 may be used as a navigation device for finding a destination. In addition, the GPS of the wireless communication terminal 100 may include a function (e.g., assisted GPS or A-GPS) for detecting positions more rapidly through assistance communication.

The liquid crystal panel 102 displays various images according to operations of the application processor 11. The liquid crystal panel 102 displays images such as a user interface image (e.g., used when a user inputs an instruction to the wireless communication terminal 100), a camera image, and a video.

The camera apparatus 200 is used to capture images according to instructions of the application processor 11.

Figure 3:
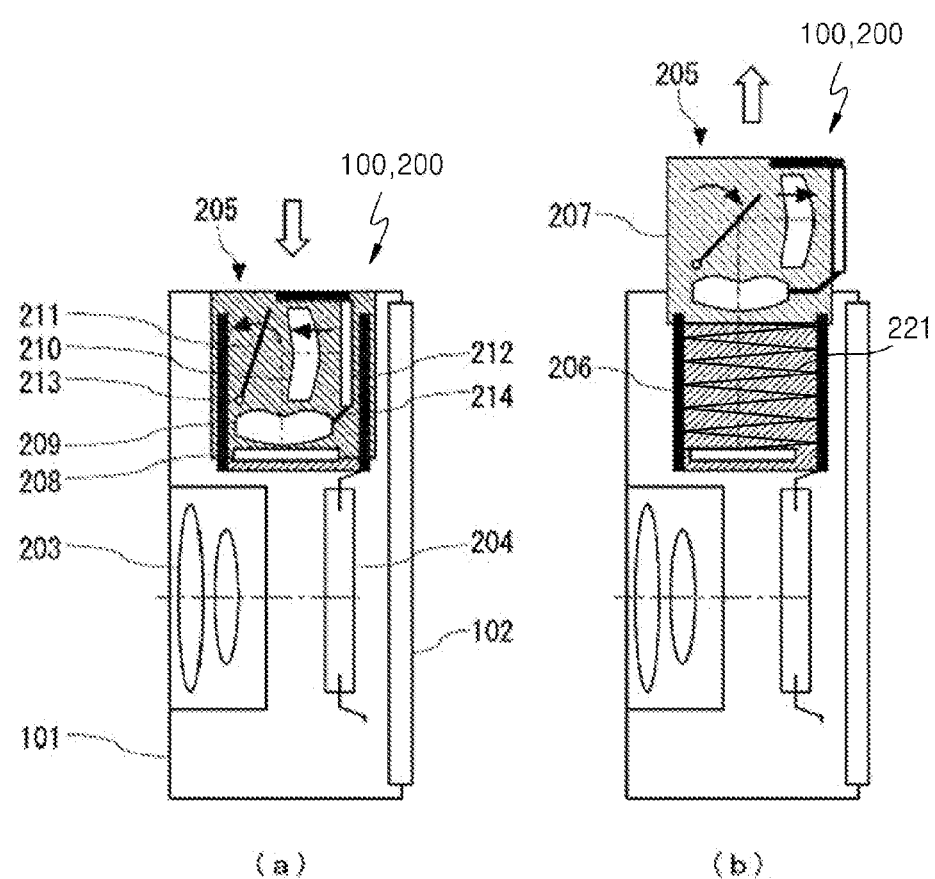
FIG. 3A and FIG. 3B are cross-sectional views of the wireless communication terminal of FIG. 1A according to the embodiment.

The camera apparatus 200 of an embodiment will now be described in detail with reference to FIGS. 3A and 3B. FIG. 3A is a cross-sectional view of the camera apparatus 200 when the viewfinder unit 205 is retracted and thus not in use. FIG. 3B is a cross-sectional view of the camera apparatus 200 when the viewfinder unit 205 is extended and able to be used. The following description will be given for the case in which the camera apparatus 200 includes the photographing lens 203 but does not include the photographing lens 201.

Referring to FIGS. 3A and 3B, the camera apparatus 200 includes the photographing lens 203, an image sensor 204, the liquid crystal panel 102, and the viewfinder unit 205. The housing 101 of the wireless communication terminal 100 is also used as a main body (camera main body) of the camera apparatus 200. The viewfinder unit 205 may include viewfinder housings 206 and 207 forming a main body of the viewfinder unit 205, a liquid crystal panel (or other display unit) 208, an object lens 209, an ocular 210, a mirror (e.g., a reflection member) 211, a viewfinder window 212, and a rotation shaft 213.

Light reflected from an object (e.g., a subject) passes through the photographing lens 203 and enters the camera apparatus 200 as an optical signal. The image sensor 204 converts the optical signal received from the photographing lens 203 into an electric signal (that is, the image sensor 204 performs image processing). The result (e.g., an image) of conversion by the image sensor 204 may be displayed on the liquid crystal panel 102 or the liquid crystal panel 208.

For example, when the viewfinder unit 205 is retracted and not in use (FIG. 3A), the image is displayed on the liquid crystal panel 102 disposed on the front side of the housing 101 of the wireless communication terminal 100 but is not displayed on the liquid crystal panel 208 of the viewfinder unit 205. On the other hand, when the viewfinder unit 205 is extended and used (FIG. 3B), the image is displayed on the liquid crystal panel 208 of the viewfinder unit 205 but is not displayed on the liquid crystal panel 102. In this way, power consumption may be reduced. However, when the viewfinder unit 205 is extended and used (FIG. 3B), the image may be displayed on both the liquid crystal panels 102 and 208.

For example, the viewfinder housing 206 may have a polygonal pillar shape and may be fixed in the housing 101. The viewfinder housing 206 has a space in which all or some components installed in the viewfinder housing 207 may be accommodated.

For example, the viewfinder housing 207 may have a polygonal pillar shape and may be slidable on the viewfinder housing 206. Referring to FIGS. 3A and 3B, the viewfinder housing 207 slides in a transverse direction of the housing 101 (a vertical direction on the plane of FIGS. 3A and 3B). That is, the viewfinder unit 205 slides in the transverse direction of the housing 101 (the vertical direction on the plane of FIGS. 3A and 3B).

For example, when the viewfinder unit 205 is retracted (FIG. 3A), the viewfinder housing 207 slides into the housing 101. In other words, the viewfinder unit 205 slides into the housing 101. On the other hand, when the viewfinder unit 205 is extended for use (FIG. 3B), the viewfinder housing 207 slides outward from the housing 101. In other words, the viewfinder unit 205 slides outward from the housing 101. For example, the viewfinder unit 205 includes: an elastic member 221 such as a spring capable of pushing the viewfinder housing 207 in a sliding direction; and a stopper (not shown) configured to fix the viewfinder housing 207 at an accommodation position or an extended position after the viewfinder housing 207 is pushed by the elastic member 221.

The liquid crystal panel 208 is disposed on the viewfinder housing 206. In detail, the liquid crystal panel 208 is disposed at a position close to a bottom of the viewfinder housing 206. In addition, a screen of the liquid crystal panel 208 is oriented in the extending direction of the viewfinder unit 205 (the upward direction on the plane of FIGS. 3A and 3B).

The object lens 209, the ocular 210, the mirror 211, the viewfinder window 212, and the rotation shaft 213 are arranged in the viewfinder housing 207.

The object lens 209 is disposed close to the bottom of the viewfinder housing 207. An optical axis of the object lens 209 is aligned with the extending direction of the viewfinder unit 205 (the vertical direction on the plane of FIGS. 3A and 3B). That is, the optical axis of the object lens 209 is perpendicular to the screen of the liquid crystal panel 208.

The mirror 211 is positioned to receive light exiting from the object lens 209. The rotation shaft 213 is disposed on a lower end portion of the mirror 211.

For example, when the viewfinder unit 205 is retracted (FIG. 3A), the mirror 211 is rotated on the rotation shaft 213 in a direction in which a reflection surface of the mirror 211 is approximately parallel with the optical axis of the object lens 209 (to the left on the plane of FIG. 3A). Therefore, the ocular 210 and the viewfinder window 212 may be accommodated in a space formed beside the reflection surface of the mirror 211. Thus, the mirror 211 is rotated based on movement of the ocular 210 (e.g., via the movement of the viewfinder unit 205). On the other hand, when the viewfinder unit 205 is extended for use (FIG. 3B), the mirror 211 is rotated on the rotation shaft 213 to a position (e.g., an initial position) (in the right direction on the plane of FIG. 3B) so that the optical axis of the object lens 209 reflected by the mirror 211 may be approximately aligned with the optical axis of the ocular 210. Referring to FIG. 3B, the mirror 211 is rotated on the rotation shaft 213 to a position at which the reflection surface of the mirror 211 makes an angle of approximately 135° with the optical axis of the object lens 209. Then, light passing through the object lens 209 may be reflected by the mirror 211 toward the ocular 210.

The ocular 210 is disposed at a position close to a side of the viewfinder housing 207 (the right side on the plane of FIGS. 3A and 3B; the front side of the housing 101). The optical axis of the ocular 210 is aligned with a direction different from the extending direction of the viewfinder unit 205. Referring to FIGS. 3A and 3B, the optical axis of the ocular 210 is parallel with a thickness direction of the housing 101 (the horizontal direction on the plane of FIGS. 3A and 3B). That is, the optical axis of the ocular 210 is perpendicular to the optical axis of the object lens 209. The ocular 210 is movable along the optical axis thereof.

The viewfinder window 212 is disposed outside the ocular 210 in the viewfinder housing 207. The viewfinder window 212 is movable together with the ocular 210.

For example, when the viewfinder unit 205 is retracted (FIG. 3A), the ocular 210 and the viewfinder window 212 are moved into the viewfinder housing 207 along their optical axes (to the left on the plane of FIG. 3A). In addition, the mirror 211 is rotated to form a space beside the reflection surface thereof. Therefore, the ocular 210 and the viewfinder window 212 are accommodated in the space formed beside the reflection surface of the mirror 211. That is, when the viewfinder unit 205 is retracted (FIG. 3A), the object lens 209, the ocular 210, the mirror 211, and the viewfinder window 212 are accommodated in the viewfinder housing 207.

On the other hand, when the viewfinder unit 205 is extended for use (FIG. 3B), the ocular 210 and the viewfinder window 212 are moved away from the viewfinder housing 207 (to the right on the plane of FIG. 3B) along their optical axes (as a result, the mirror 211 is moved to the initial position to reflect light from the object lens 209 to the ocular 210). At this time, at least the viewfinder window 212 protrudes outward from the viewfinder housing 207 (viewfinder main body). As a result, an optical path may be formed along the screen of the liquid crystal panel 208, the object lens 209, the mirror 211, the ocular 210, and the viewfinder window 212.

This optical path allows for a reduced thickness of the wireless communication terminal 100. For example, the viewfinder unit 205 may include: an elastic member 221 such as a spring capable of pushing the ocular 210 and the viewfinder window 212 outward from the viewfinder housing 207; and a stopper (not shown) configured to fix the ocular 210 and the viewfinder window 212 pushed outward to protruding positions by the elastic member 221.

For example, a guide 214 may be disposed on a lower end portion of the viewfinder window 212 or at a position close to the lower end portion of the viewfinder window 212. The viewfinder unit 205 may be retracted into the housing 101 by pushing the viewfinder unit 205 with a force in a retracting direction (downward on the plane of FIG. 3A). At this time, the guide 214 transmits a portion of the force pushing the viewfinder unit 205 (e.g., a force that retracts the viewfinder unit 205) to the viewfinder window 212 (and the ocular 210) so as to move the viewfinder window 212 into the viewfinder housing 207 (to the left on the plane of FIGS. 3A and 3B). Therefore, although the viewfinder unit 205 is only pushed inward, the viewfinder window 212 may also be moved into the viewfinder housing 207, and the viewfinder housing 207 may be moved into the housing 101. The position of the guide 214 is not limited to the above-described position. That is, the guide 214 may be disposed at another position as long as the guide 214 functions as described above.

That is, when the viewfinder unit 205 is retracted (FIG. 3A), the object lens 209, the ocular 210, the mirror 211, and the viewfinder window 212 may be accommodated into the viewfinder housing 207, and the viewfinder housing 207 may be accommodated into the housing 101. Therefore, the viewfinder unit 205 may have a reduced size. In addition, the camera apparatus 200 may have a reduced size, and accordingly, the wireless communication terminal 100, including the camera apparatus 200, may have a reduced size.

When the viewfinder unit 205 is extended for use (FIG. 3B), the viewfinder unit 205 protrudes outward from the housing 101. The viewfinder window 212 (and the ocular 210) is moved in a direction different from (perpendicular to) the extending direction of the viewfinder unit 205 and protrudes outward from the viewfinder housing 207. Therefore, as described above, an optical path may be formed along the screen of the liquid crystal panel 208, the object lens 209, the mirror 211, the ocular 210, and the viewfinder window 212.

When the viewfinder unit 205 is extended for use (FIG. 3B), the object lens 209 receives light from an image displayed on the liquid crystal panel 208 and focuses the light onto a focus point thereof to form a real image. The real image is reflected to the ocular 210 by the mirror 211. The real image formed by the object lens 209 and reflected by the mirror 211 is enlarged by the ocular 210. The real image enlarged by the ocular 210 may be seen through the viewfinder window 212.

In the camera apparatus 200 of the embodiment of FIGS. 3A and 3B, the ocular 210 is movable in a direction different from the protruding direction of the viewfinder housing 207. Therefore, in the camera apparatus 200 of the current embodiment, when the viewfinder unit 205 is retracted, the ocular 210 may be accommodated into the viewfinder housing 207. Therefore, the size of the camera apparatus 200 may be reduced. Furthermore, in the current embodiment, when the viewfinder unit 205 of the camera apparatus 200 is extended for use, the ocular 210 may protrude outward from the viewfinder housing 207 to provide a desired optical path length.

In the camera apparatus 200 of the current embodiment, since the viewfinder window 212 (and the ocular 210) is completely accommodated in the housing 101 when the viewfinder unit 205 is retracted, the viewfinder window 212 may not be contaminated, and the camera apparatus 200 may be variously designed. Furthermore, the liquid crystal panel 102 may be disposed on almost the entire region of the front side of the housing 101.

Figure 4:
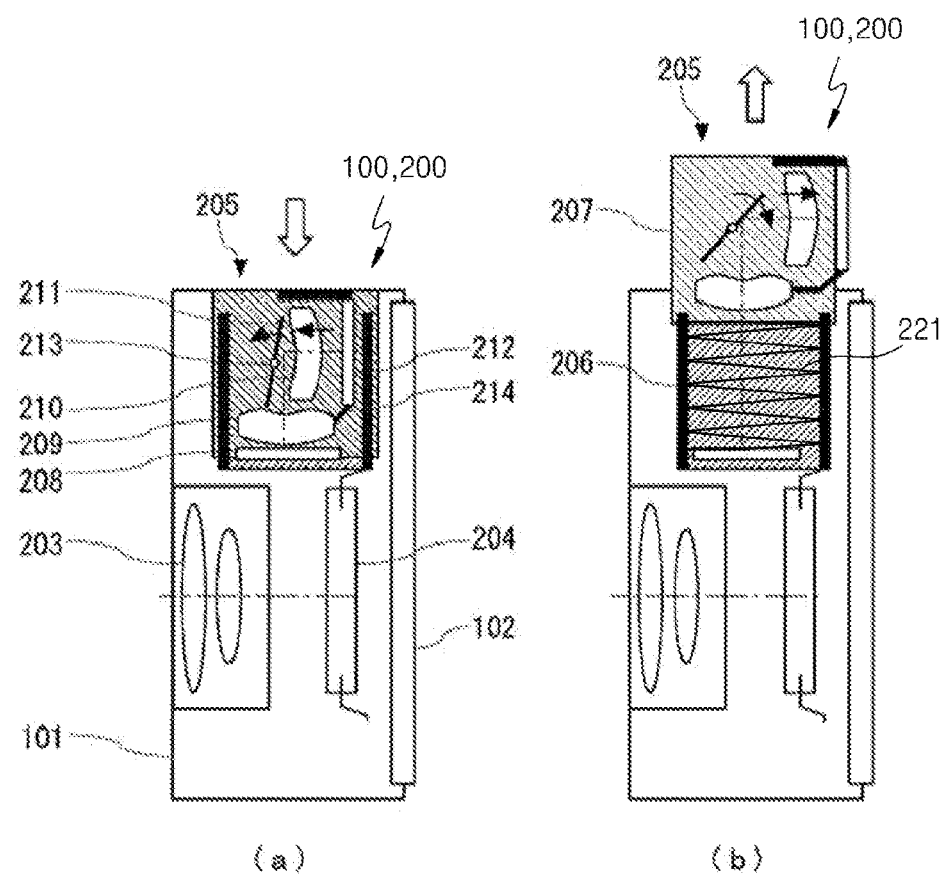
FIGS. 4A and 4B are cross-sectional views of a modification example of the embodiment of the wireless communication terminal of FIGS. 3A and 3B.

A modification example of the embodiment of the camera apparatus 200 of FIGS. 3A and 3B will now be described with reference to FIGS. 4A and 4B. FIG. 4A is a cross-sectional view of the modification example of the camera apparatus 200 when the viewfinder unit 205 is retracted. FIG. 4B is a cross-sectional view of the modification example of the camera apparatus 200 when the viewfinder unit 205 is extended.

In the camera apparatus 200 shown in FIGS. 3A and 3B, the rotation shaft 213 is disposed on the lower end portion of the mirror 211. However, in the camera apparatus 200 shown in FIGS. 4A and 4B, the rotation shaft 213 is disposed on a center portion of the mirror 211. The other structures of the camera apparatus 200 shown in FIGS. 4A and 4B are the same as those of the camera apparatus 200 shown in FIGS. 3A and 3B, and thus descriptions thereof will not be repeated.

In the camera apparatus 200 shown in FIGS. 4A and 4B, when the viewfinder unit 205 is retracted (FIG. 4A), a relatively smaller space may be formed beside the reflection surface of the mirror 211. However, a similar effect (e.g., reduced size) as that obtained in the camera apparatus 200 shown in FIGS. 3A and 3B may be obtained.

Figure 5:
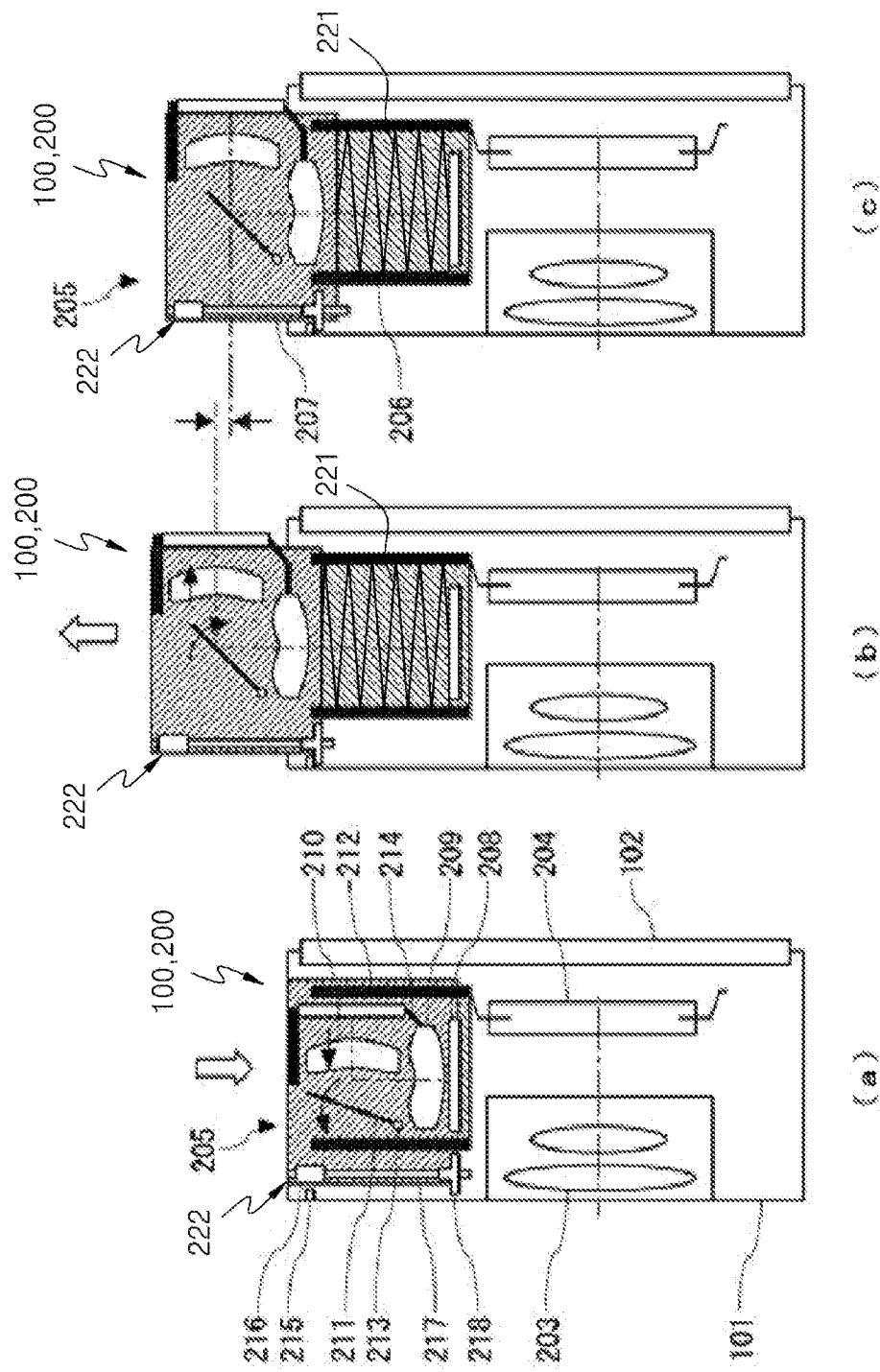
FIGS. 5A, 5B, and 5C are cross-sectional views of a wireless communication terminal according to another embodiment.

A camera apparatus 200 will be described according to another embodiment with respect to FIGS. 5A, 5B, and 5C. FIG. 5A is a cross-sectional view of the camera apparatus 200 when a viewfinder unit 205 is retracted. FIG. 5B is a cross-sectional view of the camera apparatus 200 when the viewfinder unit 205 is extended but an optical path of the viewfinder unit 205 is not yet adjusted. FIG. 5C is a cross-sectional view of the camera apparatus 200 when the viewfinder unit 205 is extended and the optical path of the viewfinder unit 205 is adjusted.

The camera apparatus 200 shown in FIGS. 5A, 5B, and 5C further includes an optical path adjustment unit 222, as compared with the camera apparatus 200 shown in FIGS. 3A and 3B. For example, the optical path adjustment unit 222 includes a stopper member 215, an optical path adjustment dial 216, a shaft 217, and a stopper screw 218. The other structures of the camera apparatus 200 shown in FIGS. 5A, 5B, and 5C are the same as those of the camera apparatus 200 shown in FIGS. 3A and 3B, and thus descriptions thereof will not be repeated.

The shaft 217 is disposed in a viewfinder housing 207 along a sliding direction of the viewfinder housing 207. Referring to FIGS. 5A, 5B, and 5C, in the viewfinder housing 207, the shaft 217 is close to a side opposite to a side at which an ocular 210 is disposed.

The optical path adjustment dial 216 is attached to the shaft 217 at a position close to an upper end portion of the shaft 217 (on the plane of FIGS. 5A, 5B, and 5C). In addition, the stopper screw 218 is attached to the shaft 217 at a position close to a lower end portion of the shaft 217 (on the plane of FIGS. 5A, 5B, and 5C). For example, the lower end portion of the shaft 217 may have a male screw shape, and the stopper screw 218 may have a female screw shape. When the viewfinder unit 205 is extended for use (FIGS. 5B and 5C), a user may rotate the shaft 217 by rotating the optical path adjustment dial 216 exposed to an outside of a housing 101. Then, the position of the stopper screw 218 relative to the optical path adjustment dial 216 is precisely adjustable.

The stopper member 215 may be fixed to the housing 101. When the viewfinder unit 205 is extended for use (FIGS. 5B and 5C), the viewfinder housing 207 pushed outward by an elastic member 221 such as a spring (not shown) may be fixed as the stopper member 215 and the stopper screw 218 make contact with each other. Therefore, when the viewfinder unit 205 is extended for use, the fixed position of the viewfinder housing 207 may be precisely adjusted by rotating the optical path adjustment dial 216 to vary the position of the stopper screw 218 relative to the optical path adjustment dial 216. That is, when the viewfinder unit 205 is extended for use, the length of an optical path may be precisely adjusted to adjust the optical path of the viewfinder unit 205.

The camera apparatus 200 of the embodiment shown in FIGS. 5A, 5B, and 5C has a similar effect (e.g., reduced size) as those of the camera apparatus 200 of the embodiment of FIGS. 3A and 3B. In addition, the camera apparatus 200 of the embodiment of FIGS. 5A, 5B, and 5C may be adjusted in optical path by precisely varying the length of an optical path by using the optical path adjustment unit 222.

Figure 6:
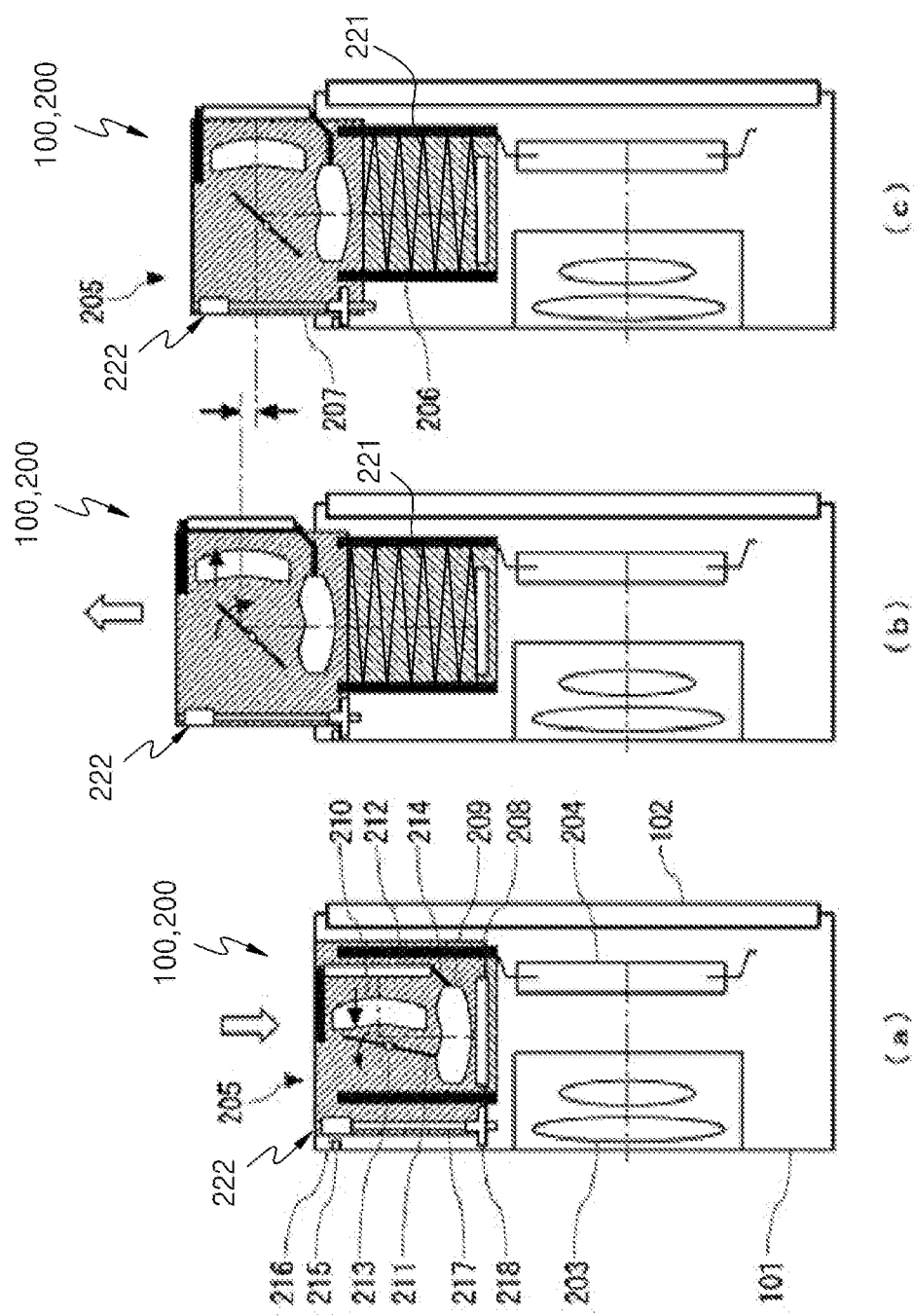
FIGS. 6A, 6B, and 6C are cross-sectional views of a first modification example of the wireless communication terminal of FIGS. 5A, 5B, and 5C.

A first modification example of the camera apparatus 200 of the embodiment of FIGS. 5A, 5B, and 5C will now be described with reference to FIGS. 6A, 6B, and 6C. FIG. 6A is a cross-sectional view of the first modification example of the camera apparatus 200 when the viewfinder unit 205 is retracted. FIG. 6B is a cross-sectional view of the first modification example of the camera apparatus 200 when the viewfinder unit 205 is extended but the optical path of the viewfinder unit 205 is not yet adjusted. FIG. 6C is a cross-sectional view of the first modification example of the camera apparatus 200 when the viewfinder unit 205 is extended and the optical path of the viewfinder unit 205 is adjusted.

In the camera apparatus 200 shown in FIGS. 5A, 5B, and 5C, the rotation shaft 213 is disposed on the lower end portion of the mirror 211. However, in the camera apparatus 200 shown in FIGS. 6A, 6B, and 6C, the rotation shaft 213 is disposed on a center portion of the mirror 211. The other structures of the camera apparatus 200 shown in FIGS. 6A, 6B, and 6C are the same as those of the camera apparatus 200 shown in FIGS. 5A, 5B, and 5C, and thus descriptions thereof will not be repeated.

In the camera apparatus 200 shown in FIGS. 6A, 6B, and 6C, when the viewfinder unit 205 is retracted (FIG. 6A), a relatively smaller space may be formed beside the reflection surface of the mirror 211. However, a similar effect (e.g., reduced size) as that obtained in the camera apparatus 200 shown in FIGS. 5A, 5B, and 5C may be obtained.

Figure 7:
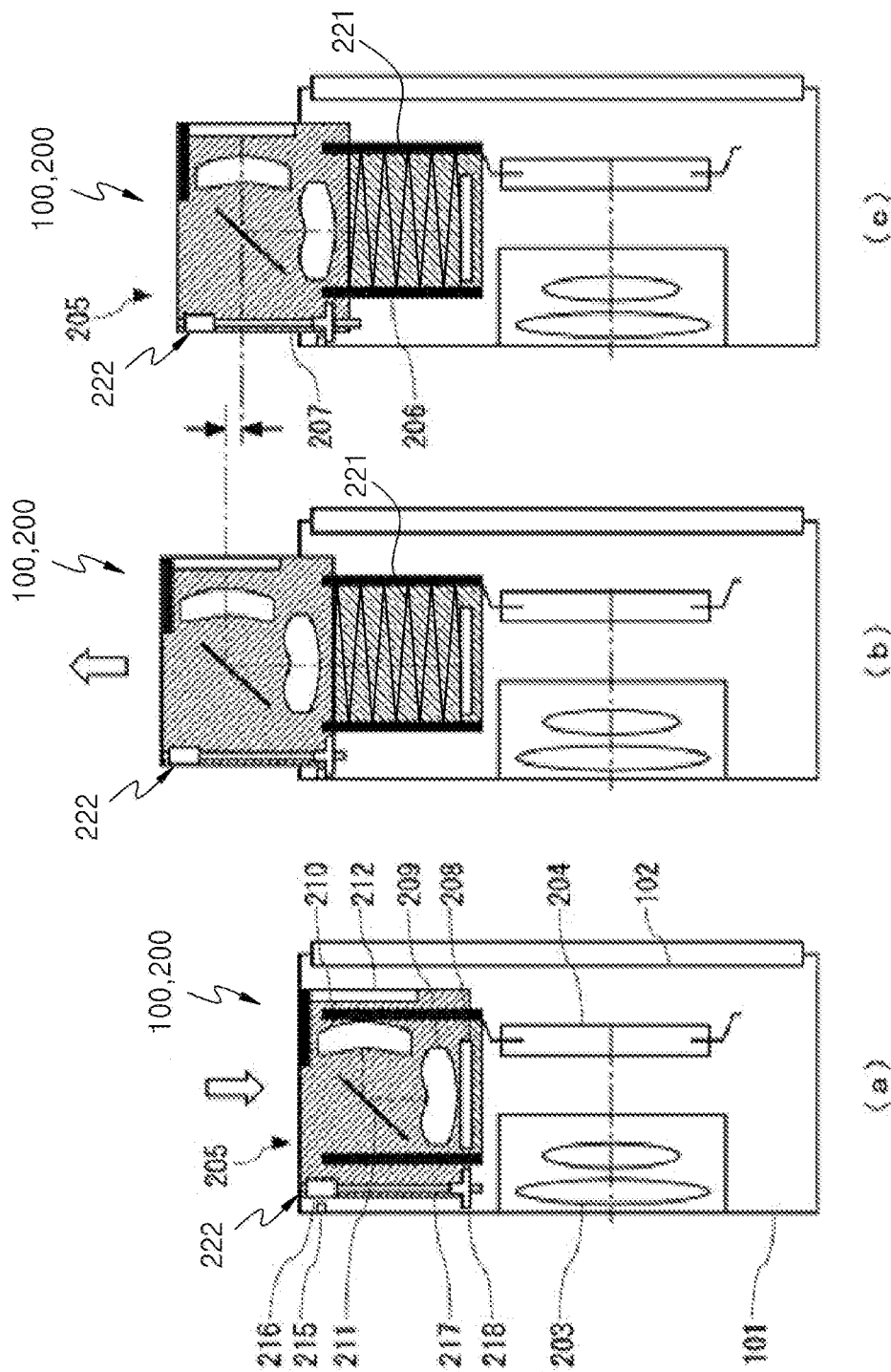
FIGS. 7A, 7B, and 7C are cross-sectional views of a second modification example of the wireless communication terminal of FIGS. 5A, 5B, and 5C.

A second modification example of the camera apparatus 200 of the embodiment of FIGS. 5A, 5B, and 5C will now be described with reference to FIGS. 7A, 7B, and 7C. FIG. 7A is a cross-sectional view of the second modification example of the camera apparatus 200 when the viewfinder unit 205 is retracted. FIG. 7B is a cross-sectional view of the second modification example of the camera apparatus 200 when the viewfinder unit 205 is extended but the optical path of the viewfinder unit 205 is not yet adjusted. FIG. 7C is a cross-sectional view of the second modification example of the camera apparatus 200 when the viewfinder unit 205 is extended and the optical path of the viewfinder unit 205 is adjusted.

As compared to the camera apparatus 200 shown in FIGS. 5A, 5B, and 5C, the camera apparatus 200 shown in FIGS. 7A, 7B, and 7C is different in that the ocular 210 and a viewfinder window 212 are not movable in a direction different from the extending direction of the viewfinder unit 205. That is, the camera apparatus 200 shown in FIGS. 7A, 7B, and 7C has only an optical path adjustment function by the optical path adjustment unit 222. Therefore, the camera apparatus 200 shown in FIGS. 7A, 7B, and 7C may omit a rotation shaft 213 and a guide 214.

In the camera apparatus 200 shown in FIGS. 7A, 7B, and 7C, since the ocular 210 and the viewfinder window 212 are not movable in a direction different from the extending direction of the viewfinder unit 205, the size of the camera apparatus 200 may be increased. However, the camera apparatus 200 may be precisely adjusted in optical path by using the optical path adjustment unit 222.

Figure 8:
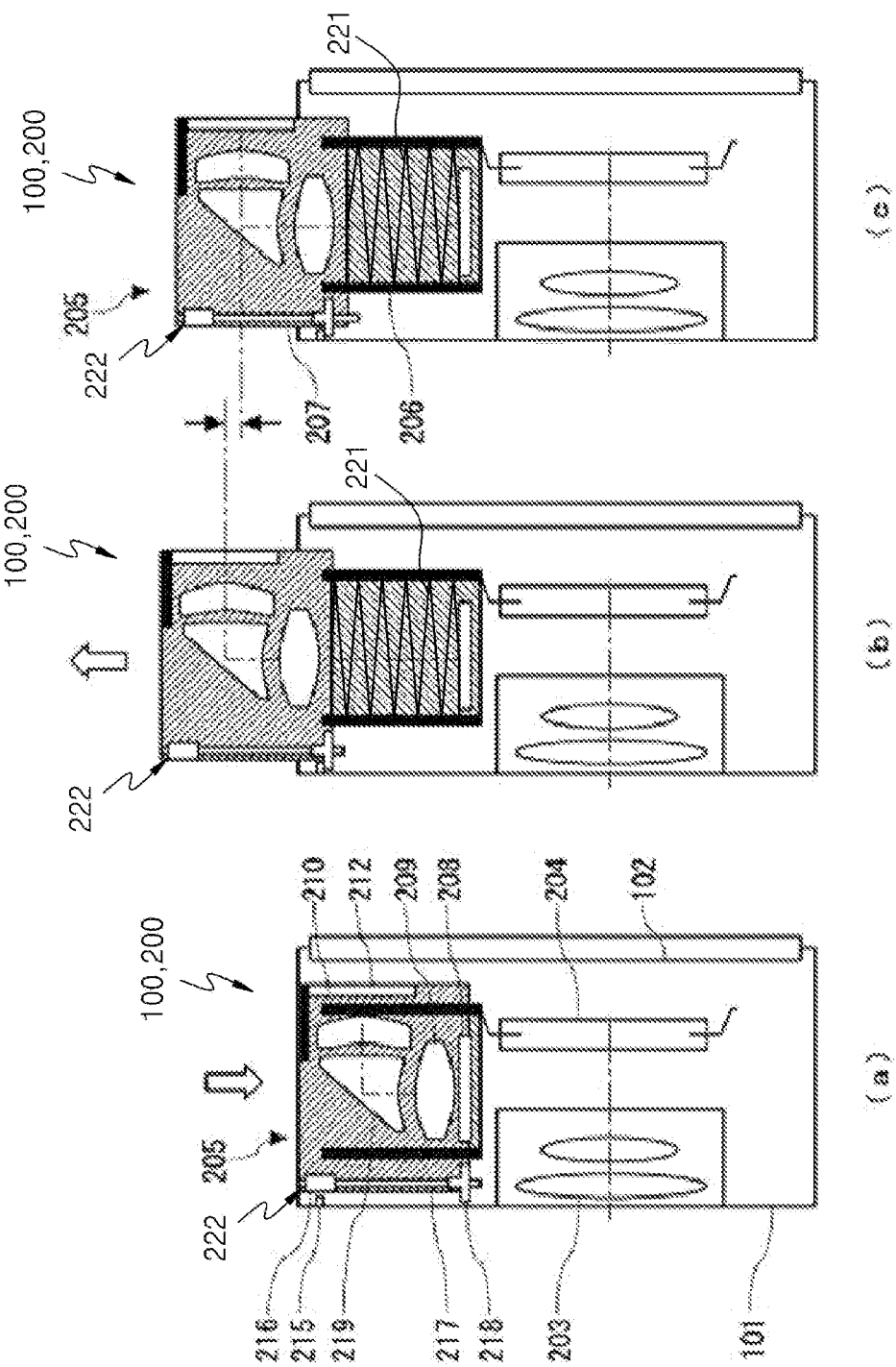
FIGS. 8A, 8B, and 8C are cross-sectional views of a third modification example of the wireless communication terminal of FIGS. 5A, 5B, and 5C.

A third modification example of the camera apparatus 200 of the embodiment of FIGS. 5A, 5B, and 5C will now be described with reference to FIGS. 8A, 8B, and 8C. FIG. 8A is a cross-sectional view of the third modification example of the camera apparatus 200 when the viewfinder unit 205 is retracted. FIG. 8B is a cross-sectional view of the third modification example of the camera apparatus 200 when the viewfinder unit 205 is extended but the optical path of the viewfinder unit 205 is not yet adjusted. FIG. 8C is a cross-sectional view of the third modification example of the camera apparatus 200 when the viewfinder unit 205 is extended and the optical path of the viewfinder unit 205 is adjusted.

As compared with the camera apparatus 200 shown in FIGS. 7A to 7C, the camera apparatus 200 shown in FIGS. 8A to 8C includes a prism (e.g., a reflection member) 219 instead of a mirror 211. The other structures of the camera apparatus 200 shown in FIGS. 8A to 8C are the same as those of the camera apparatus 200 shown in FIGS. 7A to 7C, and thus descriptions thereof will not be repeated.

The camera apparatus 200 shown in FIGS. 8A to 8C may have a similar effect (e.g., reduced size) as those of the camera apparatus 200 shown in FIGS. 7A to 7C.

Figure 9:
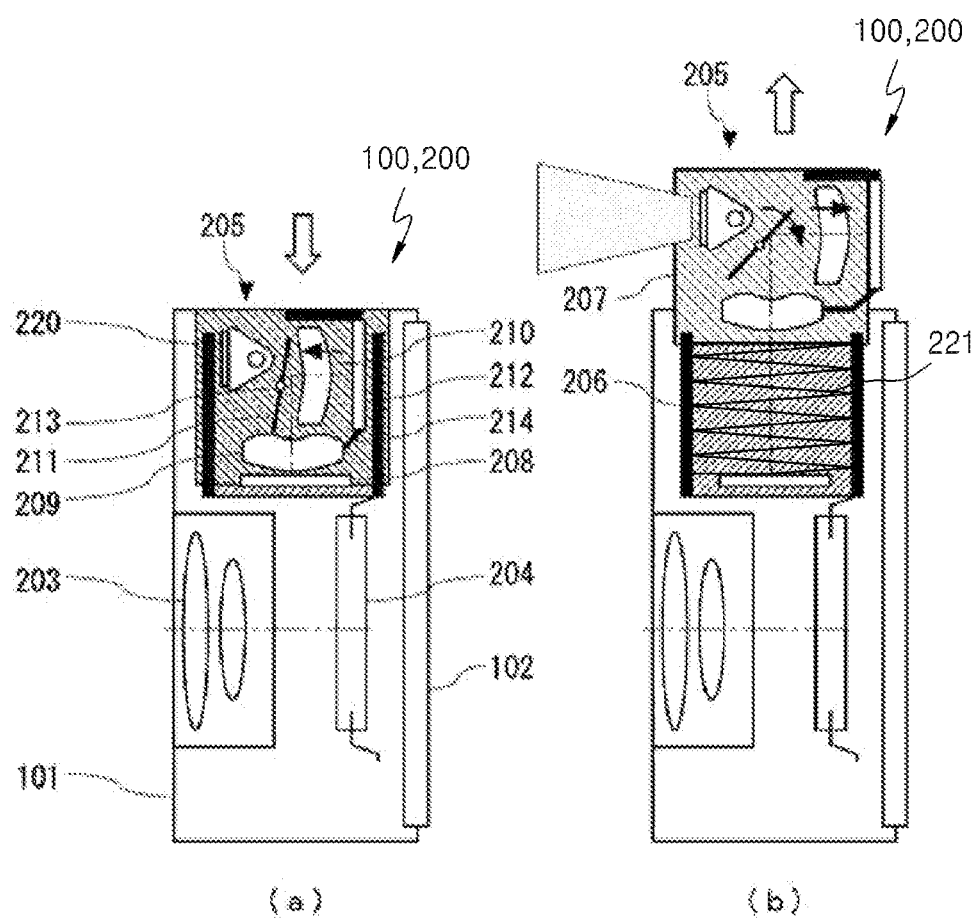
FIGS. 9A and 9B are cross-sectional views of a wireless communication terminal according to another embodiment.

A camera apparatus 200 will now be described with reference to FIGS. 9A and 9B according to another embodiment. FIG. 9A is a cross-sectional view of the camera apparatus 200 when a viewfinder unit 205 is retracted. FIG. 9B is a cross-sectional view of the camera apparatus 200 when the viewfinder unit 205 is extended for use.

As compared to the camera apparatus 200 shown in FIGS. 3A and 3B, the camera apparatus 200 shown in FIGS. 9A and 9B includes a rotation shaft 213 coupled to a center portion of a mirror 211 (not coupled to a lower end portion of the mirror 211), and a flash 220 disposed at a side opposite to a reflection surface of the mirror 211. The other structures of the camera apparatus 200 shown in FIGS. 9A and 9B are the same as those of the camera apparatus 200 shown in FIGS. 3A and 3B, and thus descriptions thereof will not be repeated.

Since the rotation shaft 213 is coupled to the center portion of the mirror 211, when the viewfinder unit 205 is retracted (FIG. 9A), an ocular 210 and a viewfinder window 212 are accommodated in a space formed beside the reflection surface of the mirror 211, and the flash 220 is accommodated in a space formed on a side opposite to the reflection surface of the mirror 211.

In this way, the camera apparatus 200 of the embodiment of FIGS. 9A and 9B has a similar effect (e.g., reduced size) as those of the camera apparatuses 200 of the previous embodiments. Furthermore, according to the other embodiment, the rotation shaft 213 is coupled to the center portion of the mirror 211. Therefore, when the viewfinder unit 205 is retracted, the ocular 210 and the viewfinder window 212 are accommodated in a space formed beside the reflection surface of the mirror 211, and the flash 220 is accommodated in a space formed on a side opposite to the reflection surface of the mirror 211.

Figure 10:
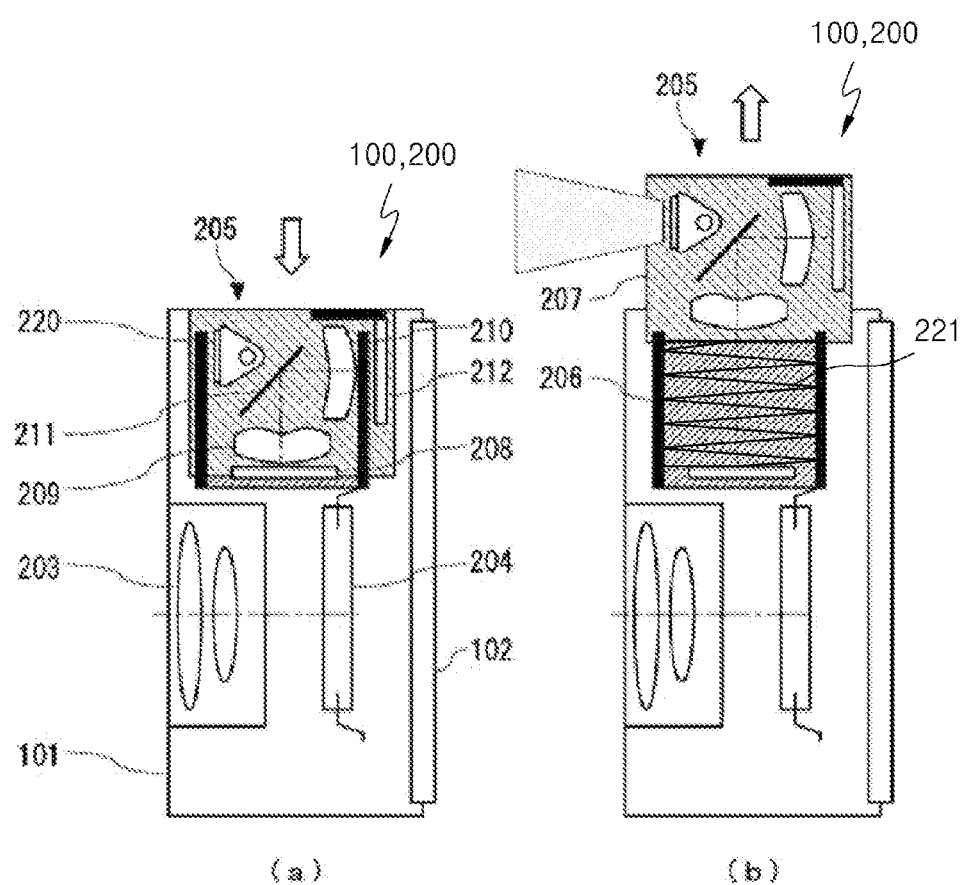
FIGS. 10A and 10B are cross-sectional views of a first modification example of the wireless communication terminal of FIGS. 9A and 9B.

Next, a first modification example of the camera apparatus 200 of the embodiment of FIGS. 9A and 9B will be described with reference to FIGS. 10A and 10B. FIG. 10A is a cross-sectional view of the first modification example of the camera apparatus 200 when the viewfinder unit 205 is retracted. FIG. 10B is a cross-sectional view of the first modification example of the camera apparatus 200 when the viewfinder unit 205 is extended for use.

As compared to the camera apparatus 200 shown in FIGS. 9A and 9B, the camera apparatus 200 shown in FIGS. 10A and 10B is different in that the ocular 210 and the viewfinder window 212 are not movable in a direction different from the extending direction of the viewfinder unit 205. Therefore, in the camera apparatus 200 shown in FIGS. 10A and 10B, the flash 220 may be disposed in a space formed at a side opposite to the reflection surface of the mirror 211. In addition, the camera apparatus 200 shown in FIGS. 10A and 10B may not include a rotation shaft 213 and a guide 214.

In the camera apparatus 200 shown in FIGS. 10A and 10B, since the ocular 210 and the viewfinder window 212 are not movable in a direction different from the extending direction of the viewfinder unit 205, the size of the camera apparatus 200 may be increased. However, the space formed at a side opposite to the reflection surface of the mirror 211 may be efficiently used.

Figure 11:
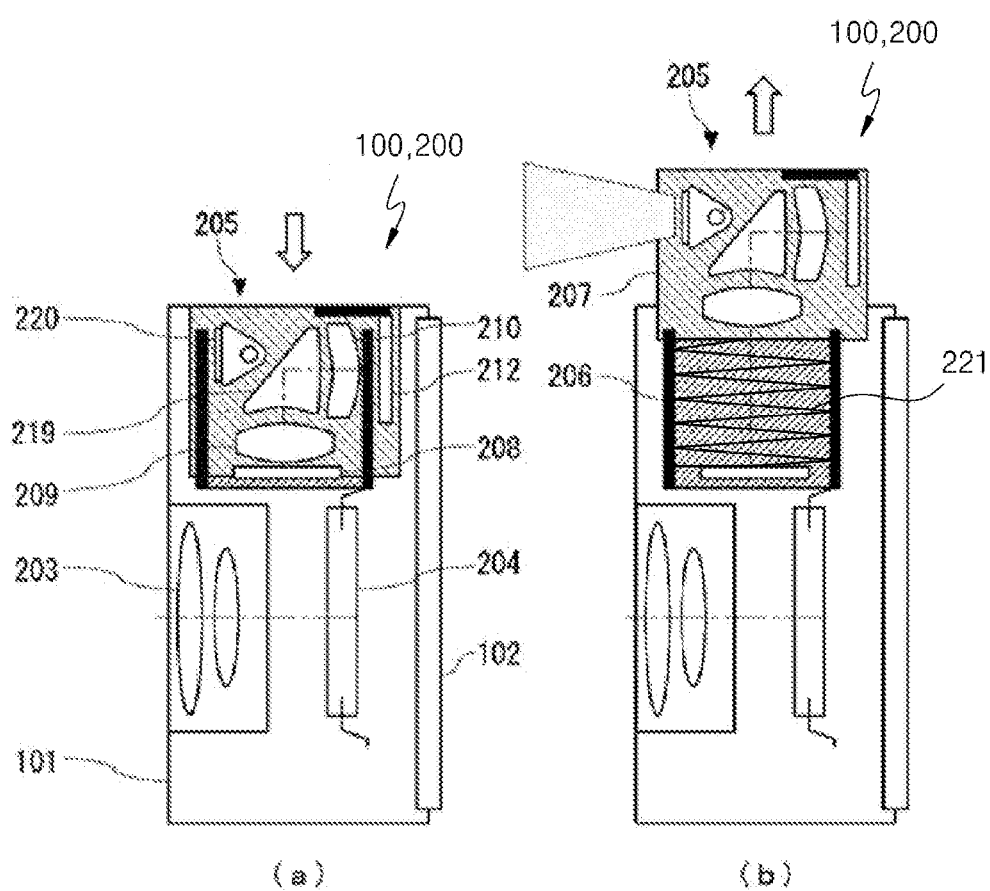
FIGS. 11A and 11B are cross-sectional views of a second modification example of the wireless communication terminal of FIGS. 9A and 9B.

A second modification example of the camera apparatus 200 of the embodiment of FIGS. 9A and 9B will now be described with reference to FIGS. 11A and 11B. FIG. 11A is a cross-sectional view of the second modification example of the camera apparatus 200 when the viewfinder unit 205 is retracted. FIG. 11B is a cross-sectional view of the second modification example of the camera apparatus 200 when the viewfinder unit 205 is extended for use.

As compared with the camera apparatus 200 shown in FIGS. 10A and 10B, the camera apparatus 200 shown in FIGS. 11A and 11B includes a prism 219 instead of a mirror 211. The other structures of the camera apparatus 200 shown in FIGS. 11A and 11B are the same as those of the camera apparatus 200 shown in FIGS. 10A and 10B, and thus descriptions thereof will not be repeated.

The camera apparatus 200 shown in FIGS. 11A and 11B may have a similar effect (e.g., reduced size) as those of the camera apparatus 200 shown in FIGS. 10A and 10B.

As described above, in the camera apparatuses 200 and the wireless communication terminal 100 including the camera apparatuses 200 according to the embodiments, the ocular 210 is movable in a direction different from the extending direction of the viewfinder housing 207. Therefore, the ocular 210 may be accommodated in the viewfinder housing 207 when the viewfinder unit 205 is retracted, and thus the camera apparatus 200 and the wireless communication terminal 100 including the camera apparatus 200 may have reduced sizes. Furthermore, in the camera apparatus 200 and the wireless communication terminal 100 including the camera apparatus 200 according to the embodiments, when the viewfinder unit 205 is extended for use, the ocular 210 may protrude outward from the viewfinder housing 207 to ensure a necessary optical path length.

Furthermore, in the camera apparatus 200 and the wireless communication terminal 100 including the camera apparatus 200 according to the embodiments, since the viewfinder window 212 (ocular portion) is completely accommodated in the camera main body (e.g., the housing of the wireless communication terminal 100) when the viewfinder unit 205 is retracted, the viewfinder window 212 may not be contaminated, and improved designs may be provided. Furthermore, the liquid crystal panel 102 may be disposed on almost the entire region of the front side of the housing 101.

As described above, according to one or more of the above embodiments, the camera apparatus 200 may have a small size, and accordingly, the wireless communication terminal 100 including the camera apparatus 200 may also have a small size.

It should be understood that the exemplary embodiments described therein should be considered in a descriptive sense only and not for purposes of limitation. Descriptions of features or aspects within each embodiment should typically be considered as available for other similar features or aspects in other embodiments.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention. In the description of the embodiments, certain detailed explanations of related art are omitted when it is deemed that they may unnecessarily obscure the essence of the invention.

The apparatus described herein may comprise a processor, a memory for storing program data to be executed by the processor, a permanent storage such as a disk drive, a communications port for handling communications with external devices, and user interface devices, including a display, touch panel, keys, buttons, etc. When software modules are involved, these software modules may be stored as program instructions or computer readable code executable by the processor on a non-transitory computer-readable media such as magnetic storage media (e.g., magnetic tapes, hard disks, floppy disks), optical recording media (e.g., CD-ROMs, Digital Versatile Discs (DVDs), etc.), and solid state memory (e.g., random-access memory (RAM), read-only memory (ROM), static random-access memory (SRAM), electrically erasable programmable read-only memory (EEPROM), flash memory, thumb drives, etc.). The computer readable recording media may also be distributed over network coupled computer systems so that the computer readable code is stored and executed in a distributed fashion. This computer readable recording media may be read by the computer, stored in the memory, and executed by the processor.

Also, using the disclosure herein, programmers of ordinary skill in the art to which the invention pertains may easily implement functional programs, codes, and code segments for making and using the invention.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, JAVA®, assembler, or the like, with the various algorithms being implemented with any combination of data structures, objects, processes, routines or other programming elements. Functional aspects may be implemented in algorithms that execute on one or more processors. Furthermore, the invention may employ any number of conventional techniques for electronics configuration, signal processing and/or control, data processing and the like. Finally, the steps of all methods described herein may be performed in any suitable order unless otherwise indicated herein or otherwise clearly contradicted by context.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism", "element", "unit", "structure", "means", and "construction" are used broadly and are not limited to mechanical or physical embodiments, but may include software routines in conjunction with processors, etc.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

What is claimed is:
1. A camera apparatus comprising:
a camera main body; and
a viewfinder unit comprising an elastic member which is retracted when the viewfinder is retracted into the camera main body, and is extended when the viewfinder is extended outward in an extending direction from the camera main body, wherein the viewfinder unit comprises:
an object lens;
an ocular movable in a direction different from the extending direction of the viewfinder unit; and
a mirror that reflects a first optical signal that passes through the object lens toward the ocular.

2. The camera apparatus of claim 1, wherein the ocular is movable in a direction perpendicular to the extending direction of the viewfinder unit.

3. The camera apparatus of claim 1, wherein when the viewfinder unit is extended, the ocular is moved outward from the viewfinder unit, and when the viewfinder unit is retracted, the ocular is moved into the viewfinder unit.

4. The camera apparatus of claim 1, wherein the viewfinder unit further comprises a guide such that a portion of a force that retracts the viewfinder unit is transmitted by the guide to move the ocular into the viewfinder unit.

5. The camera apparatus of claim 1, wherein the mirror is rotated based on movement of the ocular.

6. The camera apparatus of claim 1, wherein when the viewfinder unit is extended, the mirror is rotated to a position at which an optical axis of the object lens reflected by the mirror is aligned with an optical axis of the ocular, and when the viewfinder unit is retracted, the mirror is rotated to a position at which a space is formed beside a reflection surface of the mirror to accommodate the ocular.

7. The camera apparatus of claim 1, wherein the viewfinder unit further comprises an optical path adjustment unit such that an extending degree of the viewfinder unit is adjustable using the optical path adjustment unit.

8. The camera apparatus of claim 1, wherein the viewfinder unit further comprises a flash disposed in a region opposite to a reflection surface of the mirror.

9. The camera apparatus of claim 1, wherein the camera main body comprises:
a photographing lens that receives a second optical signal reflected from an object;
an image sensor that converts the second optical signal incident on the photographing lens into an electric signal; and
a display unit that displays a conversion result of the image sensor as an image,
wherein the object lens receives the image displayed on the display unit as the first optical signal.

10. A wireless communication terminal comprising the camera apparatus of claim 1.

11. The camera apparatus of claim 1, wherein the viewfinder unit further comprises a viewfinder window;
wherein the viewfinder window and the ocular are completely accommodated in the camera main body when the viewfinder is retracted.

* * * * *